Dec. 12, 1950  A. K. LYLE  2,533,826
APPARATUS FOR AND METHOD OF CHARGING
BATCH TO GLASS FURNACES
Filed June 10, 1947  2 Sheets-Sheet 1
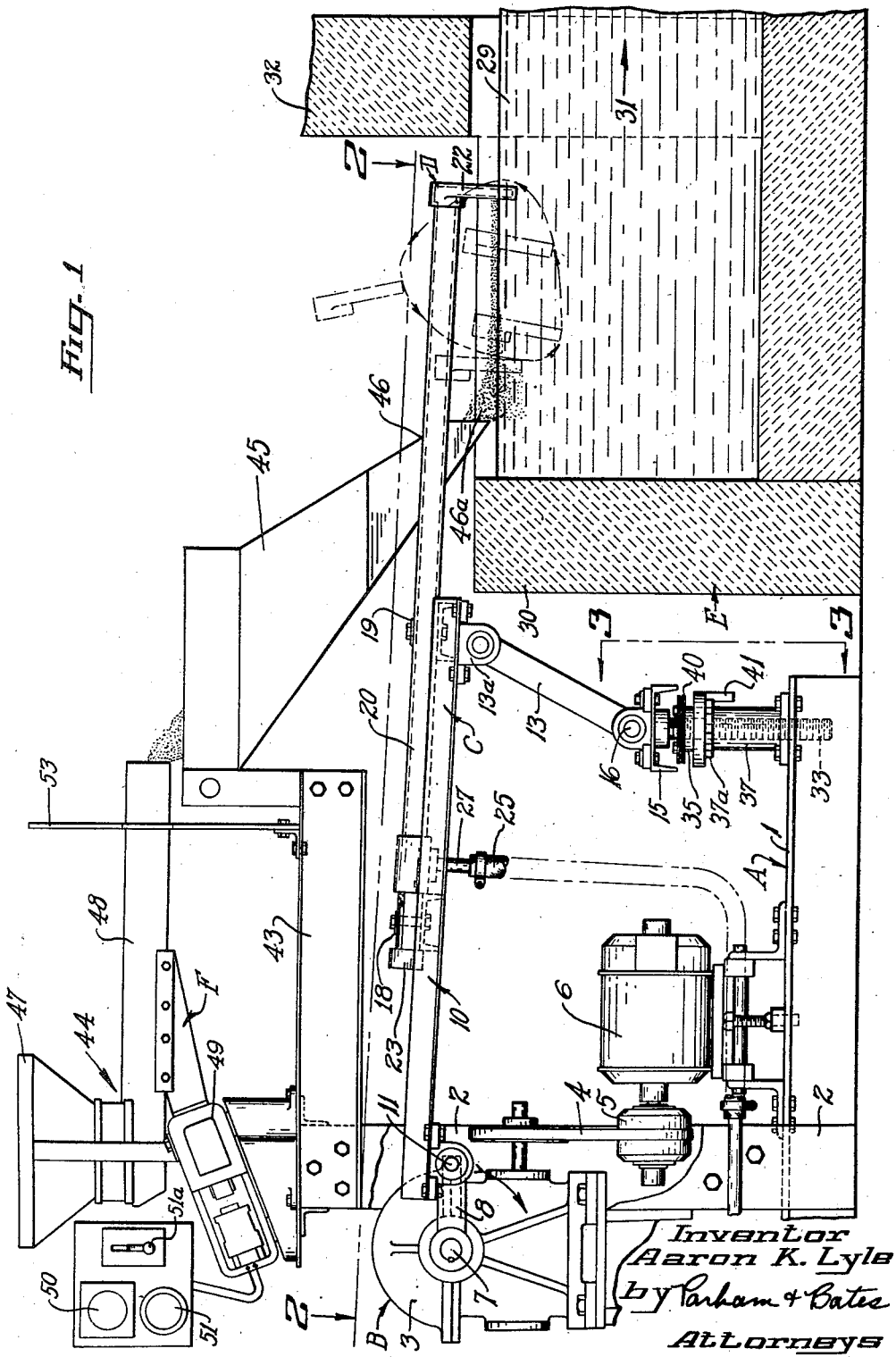
Inventor
Aaron K. Lyle
by Parham & Bates
Attorneys

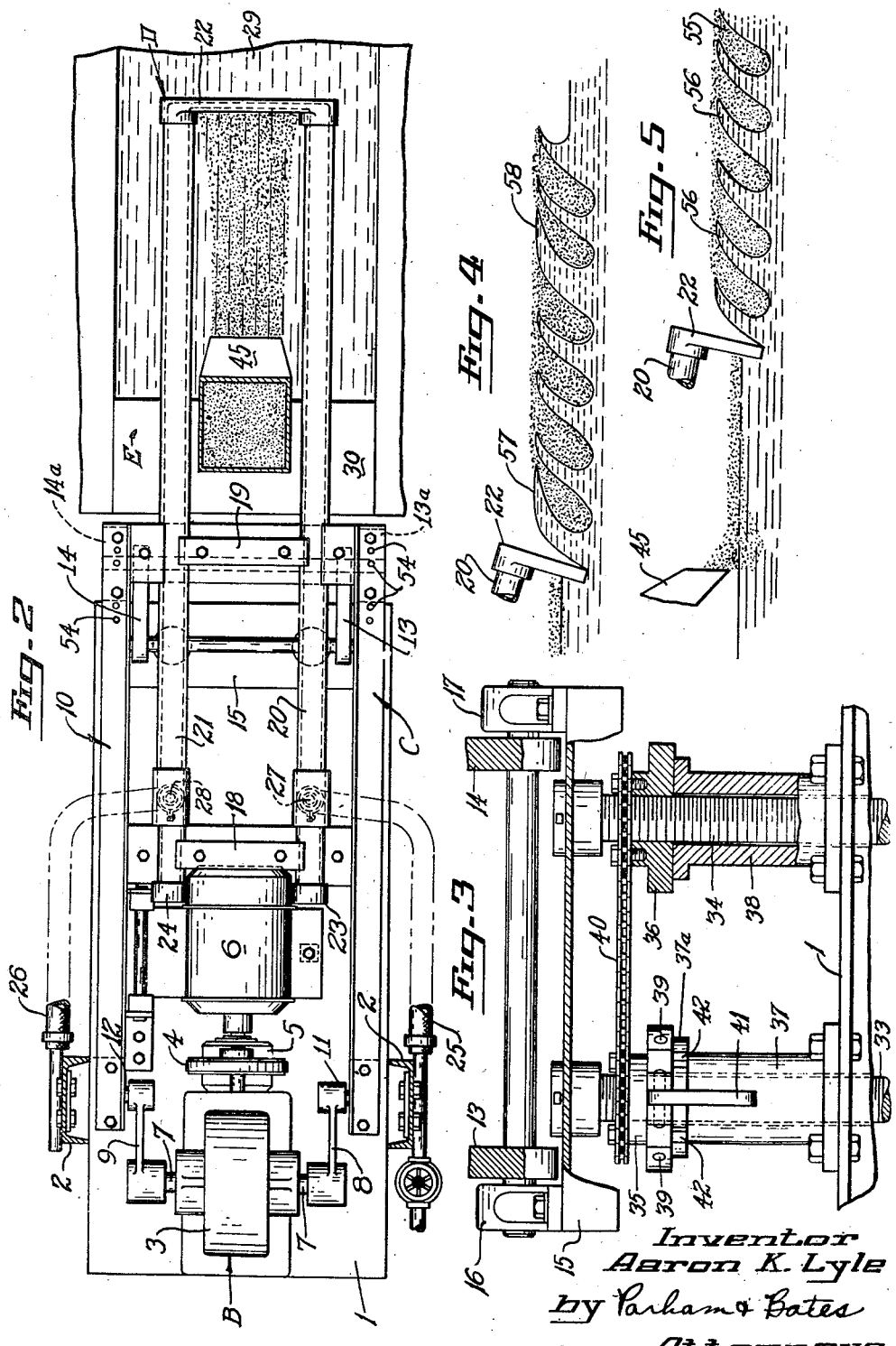

Patented Dec. 12, 1950

2,533,826

UNITED STATES PATENT OFFICE 2,533,826

APPARATUS FOR AND METHOD OF CHARGING BATCH TO GLASS FURNACES

Aaron K. Lyle, West Hartford, Conn., assignor to Hartford-Empire Company, Hartford, Conn., a corporation of Delaware Application June 10, 1947, Serial No. 753,747

5 Claims. (Cl. 49—54)

The present invention relates to devices for and methods of feeding raw materials to associated material converting equipment and relates more particularly to the charging of batch materials to glass melting furnaces.

The device of the present invention embodies a mechanically driven rabble which is operatively disposed for controlled cyclic movements within a doghouse or extension of a glass melting furnace, the rabble dipping into the molten glass of the furnace during each cycle of movement and infolding or incasing small portions of batch material within the molten glass during its successive cycles of movement. Batch material may be fed continuously or intermittently, as may be desired, to the molten glass adjacent to the rabble by any suitable means which is adapted for control of the rate of flow of the batch material.

It is an object of the present invention to promote economic melting of the batch and its subsequent solution in the molten glass of the furnace by infolding small portions of the batch within the top layer of the molten glass, thereby using to advantage the heat of the bath of molten glass to which the batch is being added and placing the batch in contact with material of relatively good heat conducting qualities.

Another object of the present invention is to prevent segregation of the batch constituents during melting by infolding small portions of the batch within molten glass in such a fashion that the constituents that fuse at relatively low temperatures are physically prevented from segregating from other more refractory constituents of the batch.

Still another object of the present invention is to provide a batch charging device and method that is adapted for charging batch to a glass melting furnace with a minimum of dust formation in the air space above the glass level of the furnace.

It is also an object of the present invention to provide a batch charging device that is adapted for stirring the molten glass in the doghouse of a glass furnace in the course of charging the furnace, whereby homogeneity of the finished glass is promoted and congealing of glass in the doghouse may be prevented.

A still further object of the present invention is to provide a device for and method of controlling the distribution of portions of batch within a glass melting furnace and, more specifically, to distribute the batch by movements in opposition to the natural convection currents of the molten glass of the furnace, thus fostering solution of the batch in the molten glass.

Other objects and advantages of the present invention will become apparent or be pointed out in the course of the following description of a preferred embodiment as illustrated in the accompanying drawings, in which:

Figure 1 is a side elevation view of the device in working disposition to a doghouse or charging bay of an associated glass melting furnace, part of the device being broken away to show the driving means thereof, the view also showing by phantom lines one of a plurality of predetermined paths of travel of a mechanically driven rabble which is a component of the device;

Fig. 2 is a view of the device, taken on line 2—2 of Fig. 1, showing certain of the cooperating elements for driving the rabble;

Fig. 3 is an elevation view, taken on line 3—3 of Fig. 1, showing mechanism for raising and lowering the forward end of the rabble drive elements, a portion of the mechanism being shown in vertical section in order to reveal the internal construction thereof;

Fig. 4 is a vertical section view of a plurality of infoldments of batch within molten glass resulting from the continuous cyclic movements of the rabble, the pattern of glass and batch shown being typical of the pattern resulting from an intermittent flow of batch to the furnace; and Fig. 5 is a vertical section view of a plurality of infoldments of batch within molten glass, the pattern of glass and batch shown being typical of the pattern resulting from a continuous flow of batch to the furnace.

Generally speaking, the herein disclosed device comprises a main supporting structure, generally designated A, which positions and supports a driving mechanism B which imparts cyclic movements to a linkage C which carries a rabble D, the rabble executing a corresponding cycle of batch infolding movements within a doghouse E of a glass melting furnace. A batch feeding device F of any desired type may be suitably located to supply a regulated flow of batch to the glass furnace adjacent to the rabble.

Referring to Fig. 1, the preferred embodiment of the present invention comprises a rigid base structure 1 which has secured thereto an upright open rectangular framework 2 which positions and supports a worm and worm wheel speed reducing unit 3 which is driven by a V belt 4 engaged with an adjustable pulley 5 which is driven by an electric motor 6. As shown in Figs. 1 and 2, gear unit 3 includes a driven shaft 7 to which drive arms 8 and 9 are secured at corresponding angular positions, the outer ends of the drive arms being pivotally secured to the respective sides of a movable, rectangular framework, generally designated 10, as indicated at 11 and 12, respectively. The forward portion of the framework 10 is pivotally secured to links 13 and 14, by bearing blocks 13a and 14a, respectively, the lower ends of the links being pivotally supported on a base member 15 at 16 and 17, respectively. (See Figs. 1, 2, and 3.)

Releasably and adjustably secured to framework 10 by clamp plates 18 and 19 are parallel pipes 20 and 21 which are threadedly secured at their outer ends to a rectangularly shaped, hollow rabble 22 and which are capped at their opposite ends by conventional means, as indicated at 23 and 24, respectively. A pair of flexible fluid conveying hoses 25 and 26, respectively, may be connected by conventional means to pipes 20 and 21, as shown at 27 and 28, respectively, to circulate cooling fluid constantly through the pipes and associated rabble 22 to prevent their overheating in the course of operation of the device.

As indicated in Fig. 1, arms 8 and 9 are continuously rotated, the associated end of framework 10 thereby being constrained to move in a circular path. The opposite end of framework 10 oscillates periodically through a limited angle of motion about pivots 16 and 17 as determined by the swinging movements of associated links 13 and 14. By virtue of its structural relationship with framework 10, rabble 22 is moved along a closed path of motion, dipping for a part of its path into glass bath 29 retained within doghouse 30 of a glass melting furnace, generally designated 31. The doghouse may be located either in the side of the glass furnace or at the rear, as may be desired, since the location thereof does not have a critical effect on the operation of the hereindisclosed device. A mantle block 32 may be provided to separate the doghouse from the glass melting furnace proper in the usual manner.

A sprocket and threaded rod mechanism has been provided by the present invention to facilitate the raising and lowering of the forward end (right hand end, as viewed in Fig. 1) of framework 10. This mechanism may comprise a pair of threaded elevating rods 33 and 34, secured to base member 15 and cooperatively positioned within threaded apertures formed within sprocket assemblies 35 and 36, respectively, which are centralized on and supported by hollow standards 37 and 38, respectively, the lower ends of the rods depending within the hollow standards, as shown in Fig. 3. Sprocket assembly 35 may be provided with spanner wrench holes 39 which may be used to rotate the sprocket and thereby raise and lower the associated threaded rod 33, as may be desired. A roller chain 40 may be engaged with sprocket assemblies 35 and 36 to impart raising and lowering movements to elevating rod 34 corresponding to the movements imparted to rod 33 by the movement of sprocket 35 as has been mentioned. A latch member 41 may be pivotally secured to a portion of sprocket 35 for cooperative engagement with one of a plurality of notches 42 formed in an upper flanged portion 37a of hollow standard 37. (See Figs 1 and 3.) The latch member, when disposed within one of the notches, acts as a positive lock means to prevent inadvertent rotation of the sprockets.

A stationary platform 43 may be secured to the upper end portion of framework 2 and a batch feeding device, generally designated 44, may be positioned thereon. This vibrator conveyor is constructed and arranged to supply a regulated flow of batch materials to a guide chute 45, the lower end of which is disposed between pipes 20 and 21, as shown at 46. The guide chute is arranged to deliver the regulated flow of batch to the surface of the glass in the doghouse adjacent to and behind the path of motion of rabble 22 as indicated at 46a. (See Figs. 1 and 2.)

The vibrator conveyor, used in the preferred embodiment of the present invention, comprises a hopper 47, within which may be stored a supply of batch materials, and a vibrator deck 48 which is operatively associated with an electric vibrator unit 49. The vibrator unit imparts controlled vibrations to the vibrator deck, thus establishing a regulated flow of the batch materials to chute 45. As a control means for regulating the operating characteristics of the vibrator conveyor, a commercially available electric timer 50 and a control rheostat 51 may be provided in the electrical circuit of the vibrator. The electric timer 50, may be adjusted so as to energize the electric vibrator unit 49 intermittently, the time periods during which the vibrator unit is energized being of a predetermined duration. It is also possible to adjust the timer so as to operate the vibrator conveyor continuously, if so desired. Control rheostat 51 may be a conventional unit and may be adjusted at will to control the rate of flow of batch material to the guide chute. A conventional on-off switch 51a may also be provided in the circuit if desired.

A radiation shield 53 may be positioned at the forward end of the vibrator conveyor to prevent overheating of the conveyor by radiant energy emanating from the doghouse and glass melting furnace.

As indicated by phantom lines in Fig. 1, the rabble, by virtue of its relationship with the before-described linkage system, is constrained to follow a closed path within the doghouse; the rabble dipping relatively deeply into the molten glass at the beginning of its stroke forward, thereafter moving forward and upward so as to ascend gradually from the glass bath near the extreme of its forward motion, thereafter moving rearwardly in the air space above the glass bath to return to its starting point and again descending into the molten glass. In order to constrain the rabble to move along other predetermined paths of motion, a series of adjustments may be made in the position of bearing blocks 13a and 14a by virtue of conventional adjustment means, as at 54, provided in the forward end of framework 10. As the bearing blocks are moved rearwardly as permitted by adjustment means 54, the path of rabble 22 is changed in a predetermined manner; namely, the rabble during the initial part of its stroke within the glass bath dips more deeply into the glass and, during its stroke within the glass bath, ascends more rapidly than indicated by the path of Fig. 1. In addition to the change of the shape of the path effected in the foregoing manner, the entire path may be lowered relative to the glass level by means of the threaded adjusting rods and associated sprockets, shown in Figs. 1 and 3 and described with reference thereto.

As the rabble moves cyclically along its closed path, it dips into the glass bath, creating a slight current in the molten glass that causes the batch that is fed to the doghouse by guide chute 45 to gradually move forward and behind the moving rabble. During the next successive cyclic, forward movement of the rabble, the batch material is infolded in molten glass simultaneously as additional batch material enters the doghouse behind the rabble. Fig. 5 shows the resulting pattern of infoldments of batch 55 within molten glass 56 after a series of cyclic movements of the rabble. It is to be noted that the pattern shown will be created when the rabble is constantly in motion and the vibrator conveyor, feeding the batch material to the guide chute, is constantly in operation.

If the vibrator conveyor is operated intermittently, a pattern of infoldments may be created similar to that shown in Fig. 4. A comparison of Figs. 4 and 5 shows that, due to the intermittent operation of the batch feeding device, irregularities are created in the pattern of infolded batch, certain of the separating sections of molten glass being larger, as indicated at 57 and 58, than the other sections of molten glass as a result of the infolding action of the rabble in the absence of batch. Intermittent operation of the batch feeding device may be used advantageously as an aid in distributing pluralities of infoldments of batch throughout the furnace, as will be described hereinafter.

It is noteworthy that a batch charging device of the type herein disclosed does not blanket the glass surface of the doghouse and furnace with a layer of batch. Inasmuch as most continuously operating glass furnaces are fired above the metal line, heat transfer to the bath of molten glass is hindered by such an insulating layer of batch materials. The infoldments of batch within molten glass that result from the use of the present device have relatively good heat transferring characteristics since molten glass has a high thermal conductivity relative to batch material and favors transfer of heat from the region above the glass level to the batch. Heat may also be extracted by the batch from the adjacent glass bath. The advantageous disposition of relatively good heat conducting materials adjacent to the batch materials leads to economy of furnace operation.

The infoldment of batch within molten glass aids in avoiding the segregation of the batch constituents which ofen occurs in glass furnaces that are charged by devices which tend to blanket the molten glass with a layer of batch material. When a mass of batch material rests upon the glass surface, the constituents of the batch that melt at low temperatures often tend to fuse and drain away from the more refractory constituents of the batch before the latter constituents begin to melt. In most glass batches, the fluxes have lower melting temperatures than the silica and other constituents of the batch. As the temperature of the batch is raised, the fluxes often tend to segregate from the more refractory constituents of the batch, thereby precluding a proper chemical reaction. The infolding of the batch material within molten glass physically retains all of the constituents in intimate relationship. Thus, even though the fluxes may fuse earlier than the other constituents, segregation of the fluxes will be prevented by physical entrapment of all the constituents whether in the molten or solid states. Prevention of such segregation normally results in a more homogeneous finished glass and is considered instrumental by many in avoiding the formation of undesirable silica scum above the metal line of the furnace.

The motion of the rabble has an inherent tendency to stir up the glass in the doghouse and promotes better homogeneity of the finished glass inasmuch as glass that is not homogeneous often results from a mal-distribution of silica. The stirring action of the rabble aids in avoiding such a condition and also tends to prevent congealing of glass in the doghouse, which occurs occasionally in the case of glasses which incorporate high silica contents and small flux contents and have relatively high viscosities when in the molten state, such as certain of the boro-silicate glasses.

It has also been found advantageous to use the batch charging device of the present invention in conjunction with regenerative furnaces, since one of the factors that limits the period of normal continuous operation of a regenerative furnace is the clogging of the regenerators by dust particles carried thereto from the batch by the furnace gases. It will be obvious from the foregoing description of the infolding action to which the batch is subjected that a minimum surface area of the batch is exposed to the air space above the glass of the furnace, thus tending to protect the batch from the action of the flames of the heating sources that are normally incorporated in a glass furnace. It has been found in practice that this protective infolding of the batch in the molten glass materially reduces the dust formation in the furnace and prolongs the period of continuous operation during which a regenerative furnace may be used. It is considered advisable to leave a small area of the batch exposed to the furnace air space to permit the liberation of gases evolved during the fusion of the batch.

An important feature of the present invention is the measure of control that may be exercised on the distribution of batch materials within the glass melting furnace. In most continuously operating glass melting furnaces, the normal convection currents at the upper surface of the molten glass radiate outwardly in all directions from a central region within the furnace. Thus, inasmuch as the doghouse is normally placed at the rear of the furnace or at a side thereof, it will be obvious that the normal convection currents at the top layer of glass tend to move towards the doghouse. A salient feature of this invention is the fact that the action of the rabble in infolding portions of batch within the molten glass is such as to move the resulting infoldments of batch inwardly towards the center of the furnace in a direction contrary to the normal convection current of the furnace. Such movements of the batch aid in dissolving the batch as the point of fusion is reached, since there is a washing action of the molten glass of the furnace beneath the infoldments of batch materials. The contrary movements of the batch are also important where intermittent operation of the batch feeding device is utilized. The resulting pattern of infolded batch, as shown in Fig. 4, has at intervals portions of molten glass of relatively great thickness. As the rabble continues its cyclic movements, the plurality of resulting batch infoldments is moved outwardly into the glass furnace due to the component of motion of the rabble in the forward direction. There is a tendency for the infoldments to separate at the large portions of molten glass, caused by the intermittent operation of the batch feeding device, due to the effect of the convection currents on the plurality of infoldments and, in time, small "islands" of infoldments are distributed about the glass furnace by the convection currents. Inasmuch as the batch material, as it enters the glass furnace, is at a relatively lower temperature than the molten glass thereof and has a chilling effect thereon, it will be obvious that such a uniform distribution of batch within the glass furnace promotes a uniform utilization of the heat in all portions of the glass furnace, thereby fostering thermal equilibrium and the production of homogeneous glass.

From the foregoing description of illustrative apparatus and modes of operation of the present invention, it will be obvious to those skilled in the art that the adjustments provided may be used as required to adapt the charger to the operating conditions of various glass furnaces. Thus, the speed of the operation of the rabble may be changed as desired by virtue of adjustable pulley 5 and the shape and disposition of the path of the rabble may be changed by means of threaded rods 33 and 34 and by the adjustment means shown at 54. The rate of feed of batch materials to the glass furnace may be regulated according to the pull of the furnace by means of the rheostate 51 and adjustment of timer 50.

Having thus described my invention and a practical application thereof to the field of glass furnaces, I claim:

1. A device for charging batch materials to glass melting furnaces comprising a movable rabble, means operatively associated with said rabble to move it cyclically along a closed path within a portion of the glass furnace so that said rabble is partially immersed in the molten glass of the furnace for a part of its travel during which it has a forward component of motion in the glass and is moved above the molten glass level for the remainder of its travel along said path, and batch feeding means constructed and arranged to supply a regulated flow of batch onto the glass in the furnace directly behind and adjacent to the portion of the path of travel of said rabble with a forward component of motion in the glass.

2. A batch charging device adapted for charging batch materials to a doghouse of a glass melting furnace comprising a movable rabble; means operatively associated with said rabble to move it through a predetermined cycle of movements, said cycle comprising movement downward into molten glass in the doghouse, movement partially beneath the level of the molten glass toward the interior of the glass furnace, movement upward out of the molten glass, and movement above the glass level towards the initial point of the cycle; and batch feeding means constructed and arranged to supply a regulated flow of batch materials onto the molten glass in the doghouse at a location directly behind and adjacent to that at which the rabble is moved downward into the glass for movement partially beneath the level of the molten glass toward the interior of the glass furnace.

3. In a batch charger for a glass melting furnace having an open doghouse containing a portion of the molten glass bath in the furnace, a rabble, a movable carrier supporting the rabble for movement in the doghouse, means to impart cyclic movements to said carrier and thence to the rabble supported thereby to cause the rabble to move continuously along a closed path such that the rabble dips into the glass bath in the doghouse during movement thereof inwardly of the doghouse toward the furnace and is lifted clear of the glass bath during return movement in the opposite direction, and means to feed batch in a stream onto the glass bath in the doghouse at a place adjacent to and outwardly from the place at which said rabble is dipped into the bath during each cyclic movement thereof.

4. The method of charging a glass melting furnace with batch material which comprises moving a rabble cyclically along a predetermined closed path of motion lying partially beneath the level of the molten glass of the furnace so as to create a current therein at the surface thereof, feeding batch material onto the molten glass directly back of the rabble when the latter is at the beginning of the portion of its path of movement lying partially beneath the level of the molten glass so as to cause the batch material thus fed to flow with the current on the surface of the glass behind the rabble, and infolding the batch material thus caused to flow with the current by a displacement of glass occurring during the successive cycle of movement of the rabble along its predetermined path partially beneath the level of the molten glass.

5. The method of charging a glass melting furnace with batch material so as to control the distribution of batch within the furnace which comprises supplying a regulated flow of batch material in a stream of unconfined batch falling onto a bath of molten glass in the furnace, moving a rabble cyclically along a closed path lying partially above and partially below the surface of the glass in the furnace at a place adjacent to and forwardly in the furnace of the place at which the stream of batch falls onto the glass so as to infold successive portions of the batch stream within successive pockets formed in the molten glass by successive cycles of movement of the rabble, the motion of the rabble being opposed to the direction of natural convection currents of the furnace during the infolding of the batch material within the molten glass.

AARON K. LYLE.

REFERENCES CITED

The following references are of record in the file of this patent:

UNITED STATES PATENTS

| Number | Name | Date |
|---|---|---|
| 1,201,664 | Williams | Oct. 17, 1916 |
| 1,361,853 | Hazel | Dec. 14, 1920 |
| 1,483,278 | Carey | Feb. 12, 1924 |
| 1,560,070 | McNamara | Nov. 3, 1925 |
| 1,594,799 | Smith | Aug. 3, 1926 |
| 1,953,221 | Good | Apr. 3, 1934 |
| 2,281,050 | Redshaw | Apr. 28, 1942 |
| 2,294,373 | Batchell | Sept. 1, 1942 |